(12) United States Patent
Brooks et al.

(10) Patent No.: US 11,835,942 B2
(45) Date of Patent: Dec. 5, 2023

(54) REAL-TIME HIGH-SPEED CLOCK SIGNAL FOR INDUSTRIAL NETWORK EMULATION

(71) Applicant: Rockwell Automation Technologies, Inc., Mayfield Heights, OH (US)

(72) Inventors: Bernard Brooks, Workingham (GB); John Pritchard, Great Missenden (GB); Antoon Laane, Kraainem (BE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 67 days.

(21) Appl. No.: 17/533,489

(22) Filed: Nov. 23, 2021

(65) Prior Publication Data

US 2023/0161336 A1     May 25, 2023

(51) Int. Cl.
  *G05B 19/418*     (2006.01)
(52) U.S. Cl.
  CPC ... *G05B 19/41885* (2013.01); *G05B 19/4183* (2013.01); *G05B 19/4185* (2013.01)
(58) Field of Classification Search
  CPC .......... G05B 19/41885; G05B 19/4183; G05B 19/4185
  See application file for complete search history.

(56) References Cited

U.S. PATENT DOCUMENTS

| 2001/0025235 A1* | 9/2001 | Otsuka | G05B 19/0426 |
| | | | 703/21 |
| 2008/0256262 A1* | 10/2008 | de Araujo | H04J 3/0688 |
| | | | 709/248 |
| 2012/0232869 A1* | 9/2012 | Maturana | G05B 17/02 |
| | | | 703/7 |
| 2015/0019191 A1* | 1/2015 | Maturana | G06F 30/20 |
| | | | 703/13 |
| 2015/0134313 A1* | 5/2015 | Maturana | G06F 9/541 |
| | | | 703/6 |
| 2015/0134317 A1* | 5/2015 | Maturana | G05B 17/02 |
| | | | 703/13 |

FOREIGN PATENT DOCUMENTS

EP      2498156 A2    12/2012

OTHER PUBLICATIONS

Extended European Search report received for European Application No. 222 05799.4 dated Mar. 28, 2023, 09 pages.

* cited by examiner

*Primary Examiner* — Christopher E. Everett
(74) *Attorney, Agent, or Firm* — Amin, Turocy & Watson, LLP

(57) ABSTRACT

An industrial simulation system exchanges data between a virtualized industrial system and an industrial controller at high frequencies and accuracies without the need for additional network emulation hardware. Rather than timing the sending of emulated device data packets from the simulation to the industrial controller using an operating system clock, the simulation system uses the arrival event of a data packet received from the industrial controller as the clock signal that drives the sending of data packets from the virtual system to the controller. Using the arrival time of data packets from the industrial controller as the clock signal rather than the system clock of the operating system can yield high accuracy, low jitter data exchanges during simulation.

20 Claims, 11 Drawing Sheets

REAL-TIME HIGH-SPEED CLOCK SIGNAL FOR INDUSTRIAL NETWORK EMULATION

BACKGROUND

The subject matter disclosed herein relates generally to industrial automation systems, and, more specifically, to simulation and testing of industrial automation systems.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for simulating industrial systems is provided, comprising a simulation component configured to execute a simulation of an industrial system under control of an industrial controller based on a virtual model of the industrial system; and a communication control component configured to receive controller data from the industrial controller directed to emulated devices of the virtual model and to send simulated device data generated by the emulated devices to the industrial controller, wherein the communication control component is configured to designate a subset of the controller data directed to one of the emulated devices as a clock signal, and to send the simulated device data to the industrial controller in response to receiving a controller data packet corresponding to the subset of the controller data.

Also, one or more embodiments provide a method, comprising executing, by a system comprising a processor, a simulation of an industrial system under control of an industrial controller based on a digital model of the industrial system, wherein the executing comprises: receiving controller data from the industrial controller directed to emulated devices of the digital model; and in response to receiving a controller data packet corresponding to a subset of the controller data designated as a clock signal, sending simulated device data generated by the emulated devices to the industrial controller.

Also, according to one or more embodiments, a non-transitory computer-readable medium is provided having stored thereon instructions that, in response to execution, cause a system to perform operations, the operations comprising executing a simulation of an industrial system under control of an industrial controller based on a virtual model of the industrial system, wherein the executing comprises: receiving controller data from the industrial controller directed to emulated devices of the digital model; and in response to receiving a controller data packet corresponding to a subset of the controller data designated as a clock signal, sending simulated device data generated by the emulated devices to the industrial controller.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
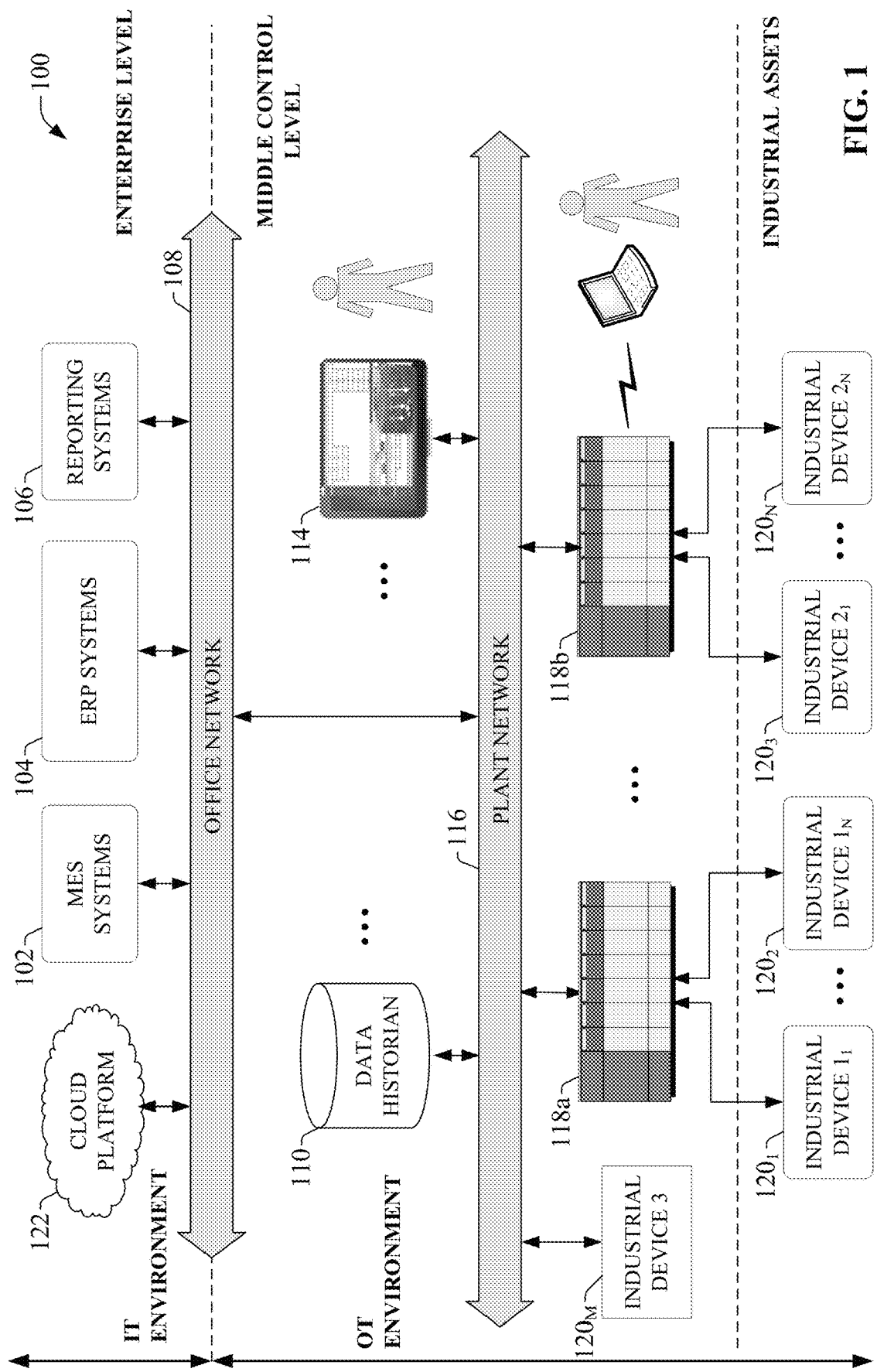
FIG. 1 is a block diagram of an example industrial environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices (e.g., sensors) that provide data relating to the controlled industrial systems to the industrial controllers 118, output devices (e.g., effectors) that respond to control signals generated by the industrial controllers 118 to control aspects of the industrial systems, or devices that act as both input and output devices. Industrial devices 120 can comprise digital input devices (e.g., push buttons, selector switches, safety devices, proximity switches, photo sensors, etc.), digital output devices (e.g., solenoid values, indicator lights, motor contactors, etc.), analog input devices (e.g., 4-20 mA telemetry devices, 0-10 VDC telemetry devices, or other analog measurement devices), or analog output devices (e.g., variable frequency drives, flow control valves, speed control devices, etc.).

While some industrial controllers 118 communicatively interface with industrial devices 120 over hardwired connections, many industrial controllers 118 exchange data with some or all of the industrial devices 120 over a network using a suitable industrial communication protocol such as CIP Class 1 or Profinet.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

Figure 2:
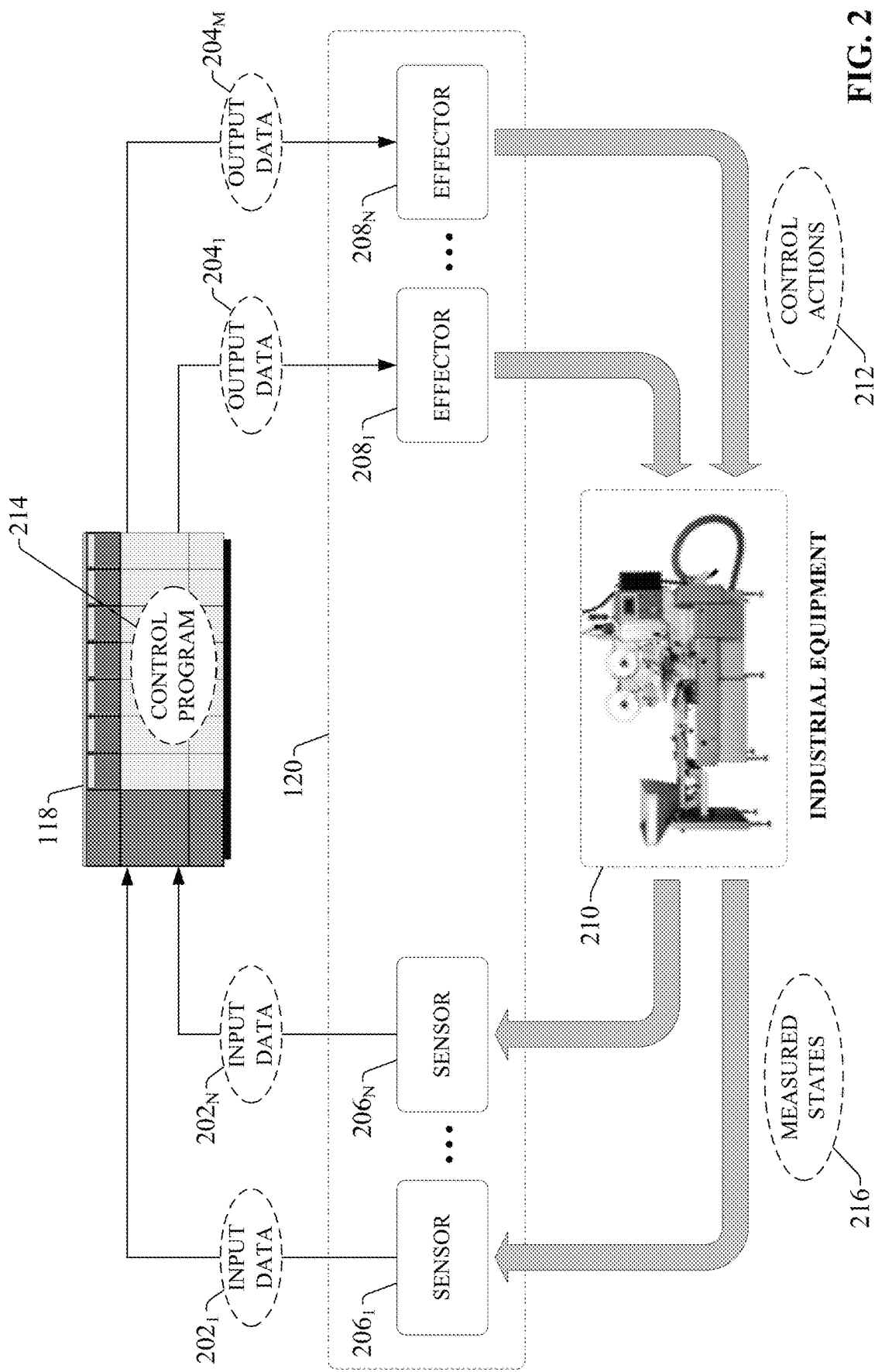
FIG. 2 is a generalized diagram illustrating data connectivity between an industrial controller and industrial devices associated with industrial equipment.

FIG. 2 is a generalized diagram illustrating data connectivity between an industrial controller 118 and industrial devices 120 (or I/O devices) associated with industrial equipment 210 in the field. As noted above, an industrial controller 118 controls industrial equipment 210—e.g., one or more machines that manufacture a product or carry out a batch process, a production line, a motion system, or other such equipment—based on monitored states of the equipment 210. Sensors 206 or other input devices read measured states 216 from the equipment 210 and convey this state information to the controller 118 as input data 202. A control program 214 executed by the controller 118 (e.g., a ladder logic program or another type of control program) processes this input data 202 and sets values or states of output data 204 to the effectors 208 based on the current values or states of the input data 202 (representing the current measured states 216 of the equipment). The output data 204 controls the states of the effectors 208 (e.g., pneumatic or hydraulic actuators, motor contactors, variable frequency drives, visual indicators, etc.) which translate to control actions 212 that control the behavior of equipment 210. In some control architectures, the industrial controller 118 exchanges data with the industrial devices 120 over an industrial network using an industrial communication protocol (e.g., CIP Class 1, Profinet, or another industrial protocol).

Figure 3:
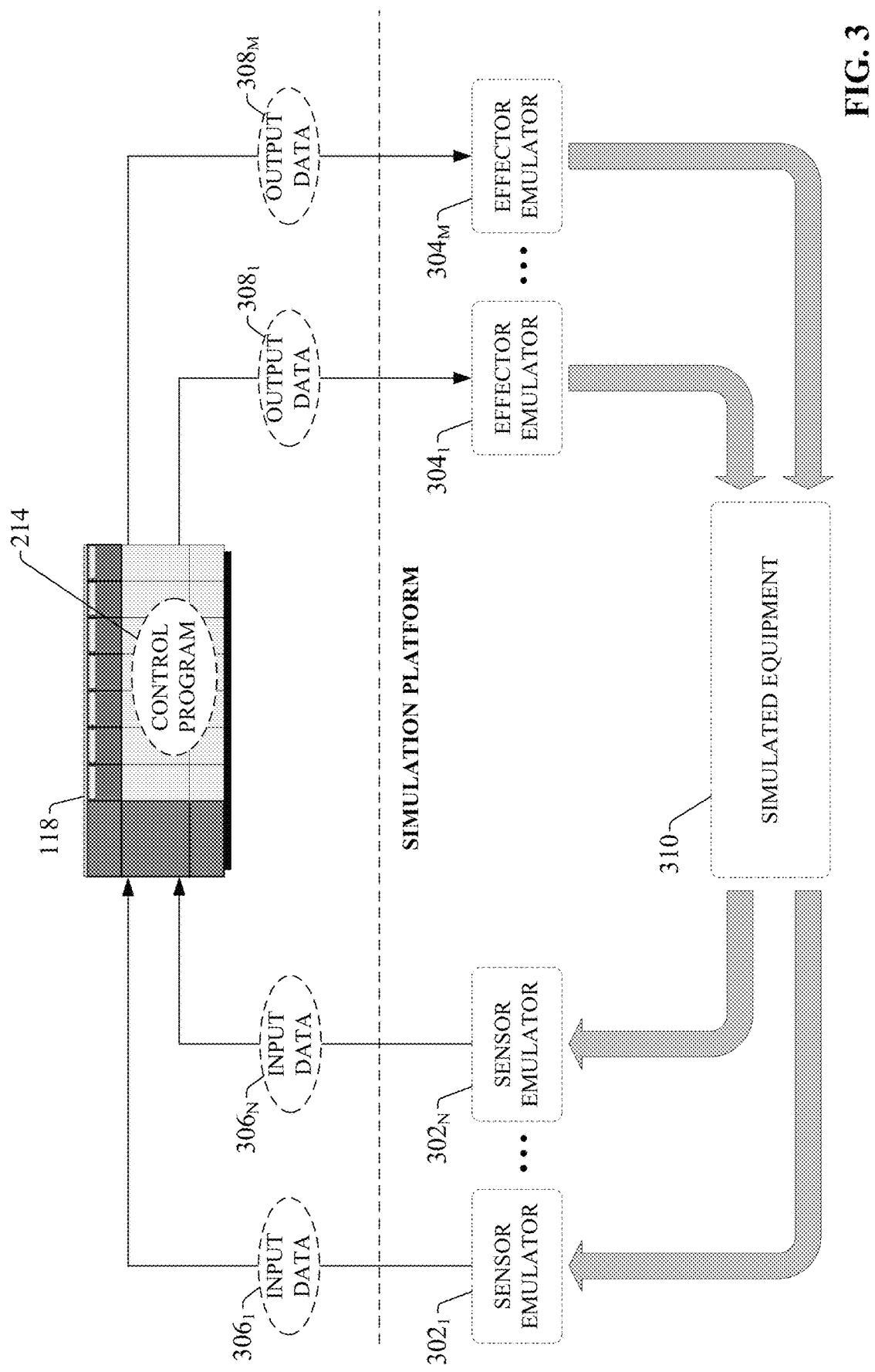
FIG. 3 is a diagram illustrating virtual commissioning of a control program against a virtual system.

In many control system development scenarios, system designers may virtually commission the control program 214 that will be executed on controller 118 prior to placing the controller 118 in service in the field. FIG. 3 is a diagram illustrating virtual commissioning of a control program 214 against a virtual system. Virtual commissioning allows a controls engineer to test and validate the control program 214 without the need to interface the controller 118 with the physical sensors 206 or effectors 208. Instead, the controller 118 exchanges simulated data with a virtual model or digital twin of the physical industrial system, which simulates the behavior of the mechanical industrial equipment and its associated sensors and effectors. The virtual system replaces the physical industrial equipment 210 with a digital simulation 310 of the equipment, and replaces the associated industrial devices 120 (e.g., sensors 206 and effectors 208) with respective sensor emulators 302 and effector emulators 304, as well as a network emulator (not shown in FIG. 3) that emulates the network between the controller 118 and the industrial devices 120.

The sensor emulators 302 of the virtual system generate simulated input data 306 based on simulated states and behaviors of the industrial equipment and send this data 306 to the controller 118. The controller 118 processes this simulated input data 306 in accordance with control program 214 and, based on this processing, generates output data 308 directed to the effector emulators 304 of the virtual system. By observing the simulated behavior of the virtual system under the control of the industrial controller 118, the control program 214 can be tested and debugged prior to deploying the program 214 on the plant floor.

Figure 4:
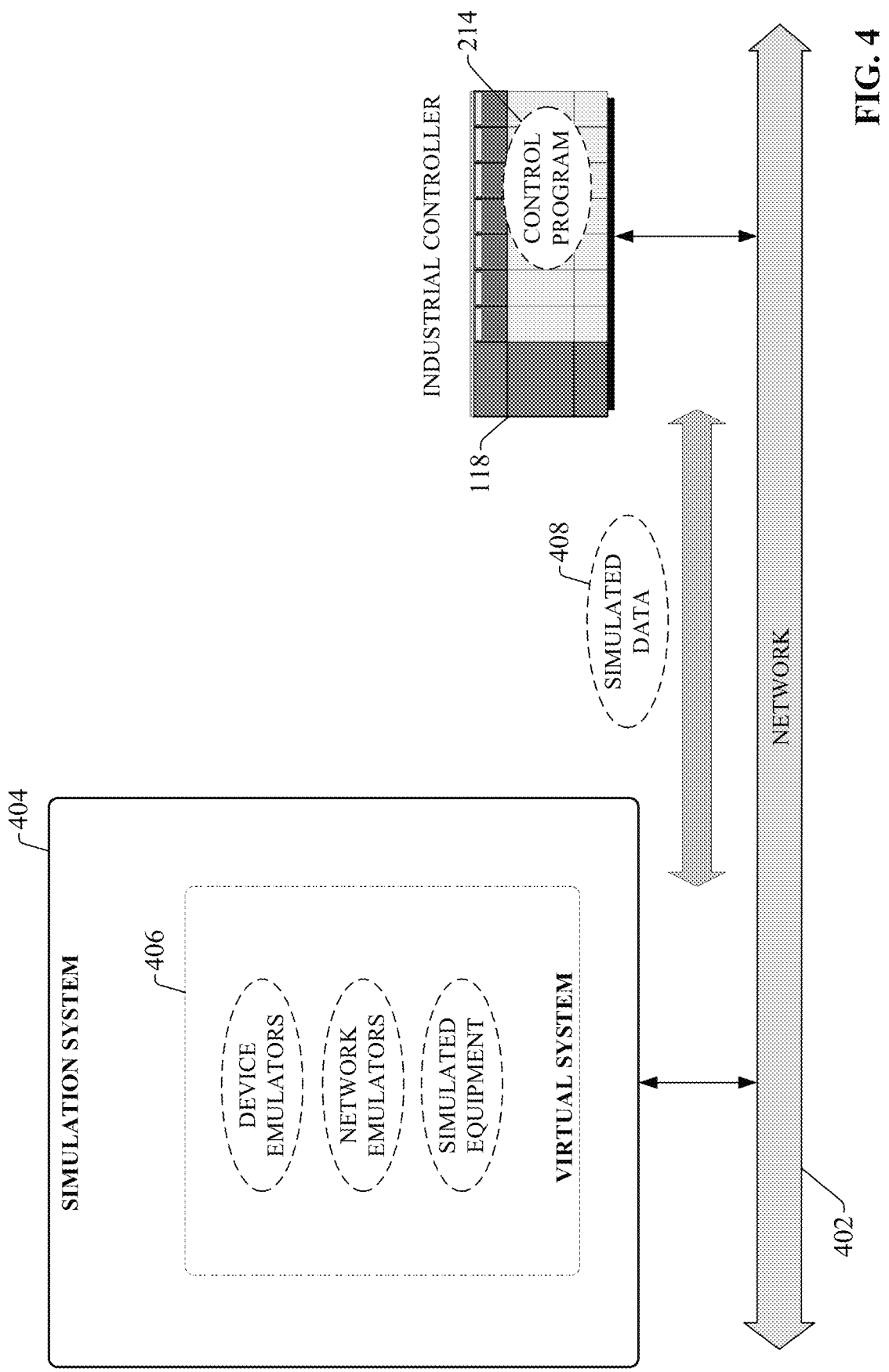
FIG. 4 is a diagram illustrating an example industrial emulation architecture.

FIG. 4 is a diagram illustrating an example industrial emulation architecture. In this example, the simulation platform that hosts the virtual system 406 can execute on a hardware platform 404 such as a Windows box, and the controller 118 can exchange simulated data 408 (including input data 306 and output data 308) with the virtual system 406 over a network 402 that links the controller 118 to the simulation hardware platform 404.

Figure 5:
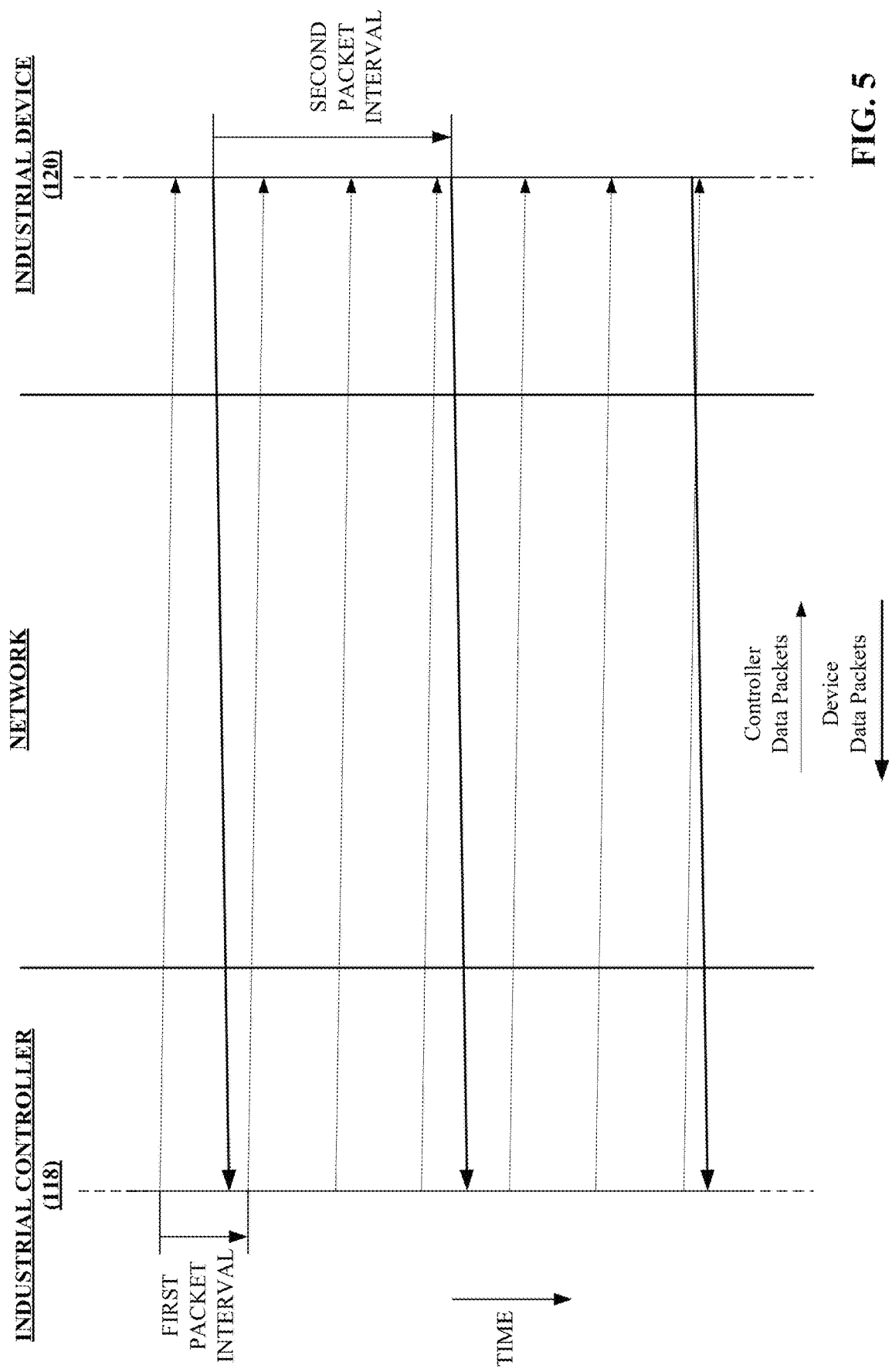
FIG. 5 is an example data exchange timing diagram illustrating cyclical data exchanges between an industrial controller and an industrial device.

However, this simulation architecture may not accurately model the communication timings between the controller 118 and the physical equipment and devices that make up the controlled industrial system. FIG. 5 is an example timing diagram illustrating cyclical data exchanges between an industrial controller 118 and an industrial device 120 (e.g., a sensor 206 or an effector 208). In the physical control environment, industrial communication protocols such as Common Industrial Protocol (CIP) Class 1 require that the controller 118 sends data packets to each device 120, and that the device 120 sends its data packets to the controller 118, according to regular cyclical schedules having fixed frequencies. In the example depicted in FIG. 5, the industrial controller 118 sends data packets to the device 120 at a first frequency corresponding to a first packet interval between data packet transmissions. The industrial device 120 sends its data packets back to the controller 118 at a second frequency corresponding to a second packet interval between data packet transmissions.

The packet interval for the controller 118 may be different than that of the device 120, depending on the type or function of the device 120. For example, a sensor 206 may send input data 202 back to the controller 118 at a high frequency (short packet intervals), while the controller 118 may send less frequent data packets to the sensor 206 (at longer packet intervals) to periodically convey to the sensor 206 that the controller 118 is still present. Meanwhile, the controller 118 may send output data 204 to an effector 208 at a high frequency, while the effector 208 may send data packets to the controller 118 at a lower frequency to indicate that the effector 208 is still present. Each of the controller 118 and the device 120 sends its data packets according to its fixed packet interval regardless of the timing of incoming packets from the other device (that is, packets are not sent in response to a request received from the other device). For a given control application comprising many industrial devices 120, the controller 118 will maintain many such data conversations (one with each device 120). Some data exchanges in the physical environment occur at very high frequencies, with short network packet intervals sometimes as low as 125 microseconds (that is, at a rate of 1 packet per 125 microseconds). For some control applications, such as motion control applications, the timing of these network packets must be very accurate.

In the virtual simulation realm in which the industrial controller 118 exchanges data with a hardware platform 404 executing a virtual system 406 that digitally represents the physical equipment, the scheduling of data packets to be sent at short, accurate intervals representative of the high frequencies seen in the physical environment can be problematic. This is due in part to limitations of the system clock used by the operating system of the hardware platform 404, whose default timer granularity may not be small enough to allow data packets to be scheduled at the short intervals required in the physical control environment. In the case of the Windows operating system, for example, the default timer granularity may only be 10 milliseconds. Moreover, the operating system of the hardware platform 404 may only be capable of scheduling data packets with relatively low accuracy (e.g., approximately 4 milliseconds), many times lower than the high level of timing accuracy required of many control applications. The inability of the hardware platform 404 to support the high frequency, high accuracy data exchanges reflective of the physical control system can result in highly variable data packet timing, or jitter, during simulation.

To address these and other issues, one or more embodiments described herein provide an industrial simulation system that can exchange data with an industrial controller 118 at suitably high frequencies and accuracies without the need for additional network emulation hardware, even if the simulation system is executed on a hardware platform whose default timer granularity is not small enough to accurately emulate realistic plant-floor communication speeds. In one or more embodiments, rather than timing the sending of data packets from the simulation to the industrial controller 118 using the clock signal of the hardware platform's operating system or a separate piece of network emulation hardware, the simulation system uses the arrival event of a data packet received from the industrial controller 118 as the clock signal that drives the sending of data packets from the virtual system to the controller 118. Since the controller 118 is a real-time system that sends its data packets to the emulated devices (e.g., sensor emulators 302 and effector emulators 304) at precisely timed intervals controlled by its own internal clock, and at the same frequencies at which it will send output data 204 to the physical devices 120, a suitable high-frequency data packet stream from the controller 118 can be selected as the clock signal that will be used by the simulation system to schedule transmission of its data packets to the controller 118. Using the arrival time of data packets from the industrial controller 118 as the clock signal rather than the system clock of the operating system can yield high accuracy, low jitter data exchanges during simulation.

Figure 6:
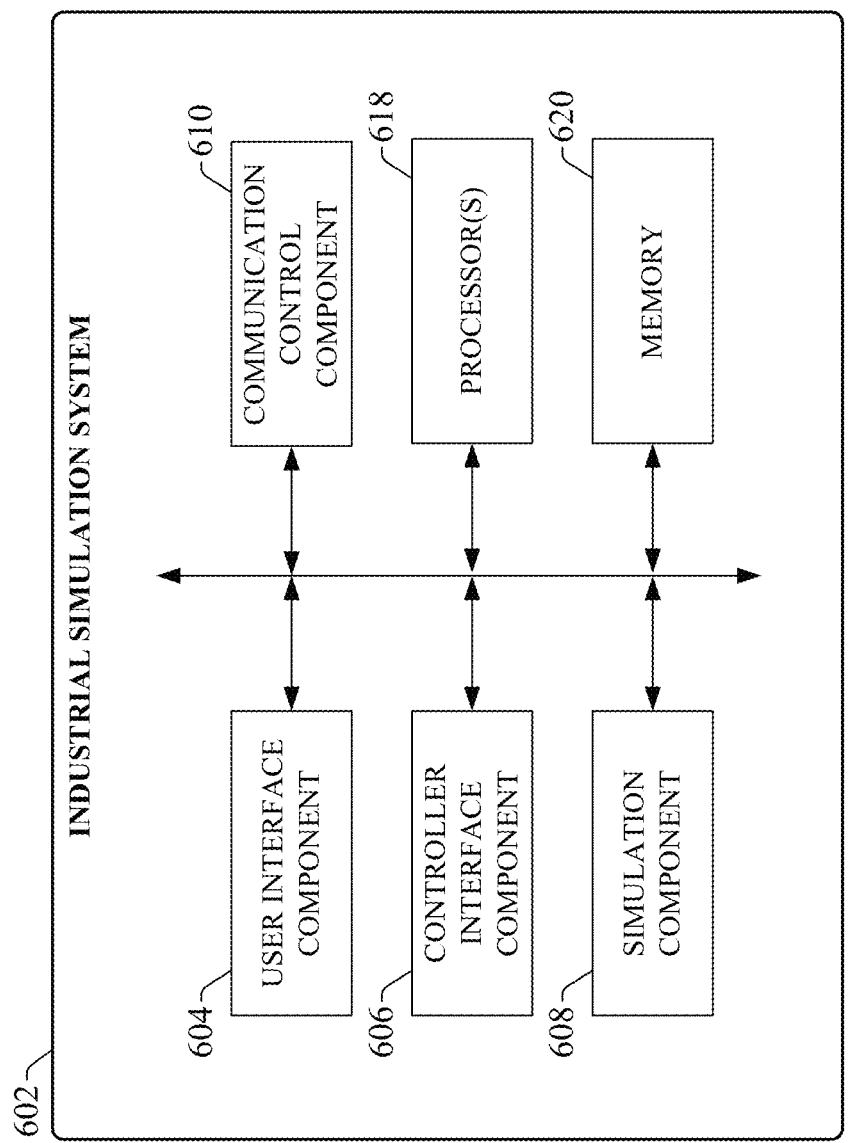
FIG. 6 is a block diagram of an example industrial simulation system that uses the arrival time of data packets from an industrial controller to trigger the sending of simulated device data packets to the controller.

FIG. 6 is a block diagram of an example industrial simulation system 602 that uses the arrival time of data packets from an industrial controller to trigger the sending of simulated device data packets to the controller. Industrial simulation system 602 can include a user interface component 604, a controller interface component 606, a simulation component 608, a communication control component 610, one or more processors 618, and memory 620. In various embodiments, one or more of the user interface component 604, controller interface component 606, simulation component 608, communication control component 610, the one or more processors 618, and memory 620 can be electrically and/or communicatively coupled to one another to perform one or more of the functions of the industrial simulation system 602. In some embodiments, components 604, 606, 608, and 610 can comprise software instructions stored on memory 620 and executed by processor(s) 618. Industrial simulation system 602 may also interact with other hardware and/or software components not depicted in FIG. 6. For example, processor(s) 618 may interact with one or more external user interface devices, such as a keyboard, a mouse, a display monitor, a touchscreen, or other such interface devices.

User interface component 604 can be configured to receive user input and to render output to a user in any suitable format (e.g., visual, audio, tactile, etc.). In some embodiments, user interface component 604 can render interactive display screens on a display device (e.g., a display device associated with a desktop computer, a laptop computer, a tablet computer, a smart phone, etc.), where the display screens serve as the interface for a simulation platform. An industrial simulation executed by the system 602 can be rendered by the user interface component 604 in any suitable format. For example, in some embodiments the user interface component 604 can display a virtual 3 D representation of an automation system being tested against an industrial control program 214, and can animate the virtual representation to reflect substantially real-time simulated behaviors of the automation system under the control of the industrial controller executing the program 214. Some embodiments of user interface component 604 can also render operational statistics based on results the simulation.

Controller interface component 606 can be configured to communicatively interface the system 602 with a hardware industrial controller 118 via a network connection (e.g., network 402 shown in FIG. 4) and to exchange simulated data between the controller 118 and a virtualized model of an industrial system (also referred to herein as a virtual system 406) being simulated by the system 602. Simulation component 608 can be configured to simulate operation of the virtual system 406 under control of an industrial control program 214 being executed by the controller 118. Communication control component 610 can be configured to schedule the sending of simulated data from the virtual system 406 (e.g., from emulated I/O devices such as sensor emulators 302 and effector emulators 304) to the industrial controller 118 over the network connection based on arrival times of data packets from the industrial controller.

The one or more processors 618 can perform one or more of the functions described herein with reference to the systems and/or methods disclosed. Memory 620 can be a computer-readable storage medium storing computer-executable instructions and/or information for performing the functions described herein with reference to the systems and/or methods disclosed.

Figure 7:
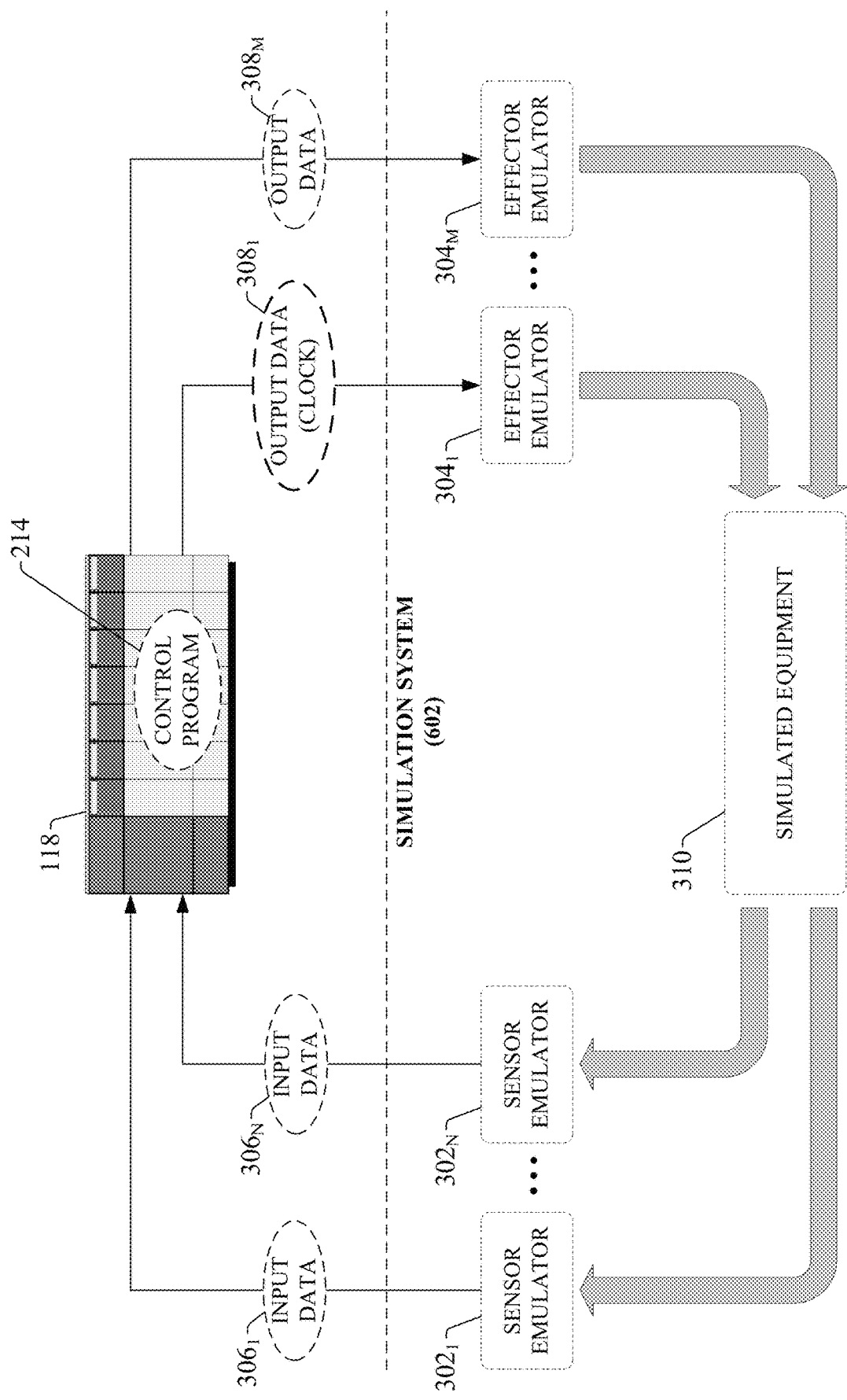
FIG. 7 is a diagram illustrating exchange of simulated data between a simulation system and an industrial controller during simulation of an industrial system.

FIG. 7 is a diagram illustrating exchange of simulated data between the simulation system 602 and an industrial controller 118 during simulation of an industrial system. Similar to the virtual commissioning scenario depicted in FIG. 3, the simulation system 602 executes a digital, simulation-capable model of an industrial automation system. The digital model comprises a digital simulation 310 of industrial equipment (e.g., an industrial machine or production line) as well as device emulators 302 and 304 that model the sensors and effectors, respectively, that serve as I/O devices that interface the industrial equipment with the industrial controller 118. Sensor emulators 302 can emulate such digital and analog input devices as photosensors, proximity switches, telemetry devices (e.g., temperature meters, pressure meters, flow meters, voltage meters, etc.), push buttons, safety input devices (e.g., light curtains, safety mats, pull cords, etc.), or other such sensors. Effector emulators 304 can emulate digital and analog output devices such as pneumatic or hydraulic actuators, motor contactors, visual or audible indicators such as stack lights or sirens, or other such effectors. Some emulated devices, such as variable frequency drives or industrial robots, may act as both a sensor and an effector (or may act as multiple sensors and effectors) from the perspective of the controller 118.

As noted above, when an industrial communication protocol such as CIP Class 1 is used in the physical plant floor environment, the industrial controller 118 maintains an individual data exchange conversation with each I/O device 120 (sensors 206 and effectors 204), whereby the controller 118 sends data packets to the device 120 at a first fixed packet interval, and the device 120 sends data packets to the controller 118 at a second fixed packet interval (as illustrated in FIG. 5). During operation of an industrial control application comprising many I/O devices, many such conversations are being carried out between the controller 118 the devices 120 that make up the controlled system. The frequency at which data packets are sent by the controller 118 or a device 120 can vary across the control system, as noted above in connection with FIG. 5.

Likewise in the virtual domain, the controller 118 maintains an individual data conversation with each of the device emulators 302 and 304, with the frequency at which data packets are sent by the controller 118 or the device emulator 302, 304 varying across the simulated system. Since the industrial controller 118 is a real-time hardware control device with its own internal clock, the controller 118 sends its data packets (e.g., output data 308 to the effector emulators 304) to the simulated system at accurately timed intervals controlled by its clock, and at frequencies that are analogous to the frequencies at which packets will be sent to the physical I/O devices 120. For data packets sent by the device emulators 302, 304 to the controller 118 (e.g., input data 306 generated by the sensor emulators 302), the default timer granularity of the operating system on which the simulation system 602 operates may not be sufficiently small to drive the high frequency, short interval data packet transmission expected of some physical devices 120. Therefore, in order to accurately emulate the high frequency data packet transmissions of the analogous physical I/O devices 120, simulation system 602 triggers transmission of data packets from the device emulators 302, 304 to the controller 118 based on the arrival time of data packets from the controller 118 rather than the system clock of the operating system.

To this end, the simulation system's communication control component 610 can select a suitable stream of data packets from the controller 118 to be used as a clock signal to drive transmission of data packets from the virtual system to the controller 118. In the example depicted in FIG. 7, the data packets that carry output data $308_1$ to effector emulator $304_1$ have been selected as the clock signal. In general, any stream of data packets from the controller 118 having a sufficiently high frequency (low packet interval) can be used as the clock signal that will drive the sending of data packets from the device emulators 302, 304 to the controller 118.

The selected clock data packets need not be functionally related to the device data packets that will be sent from the emulated devices 304, 304 back to the controller 118. Rather, the controller data packets selected to be used as the clock signal may correspond to output data $308_1$ directed to an effector emulator 304 that is not directly related to the emulated devices whose data packets are to be scheduled by the selected controller data packet.

Figure 8:
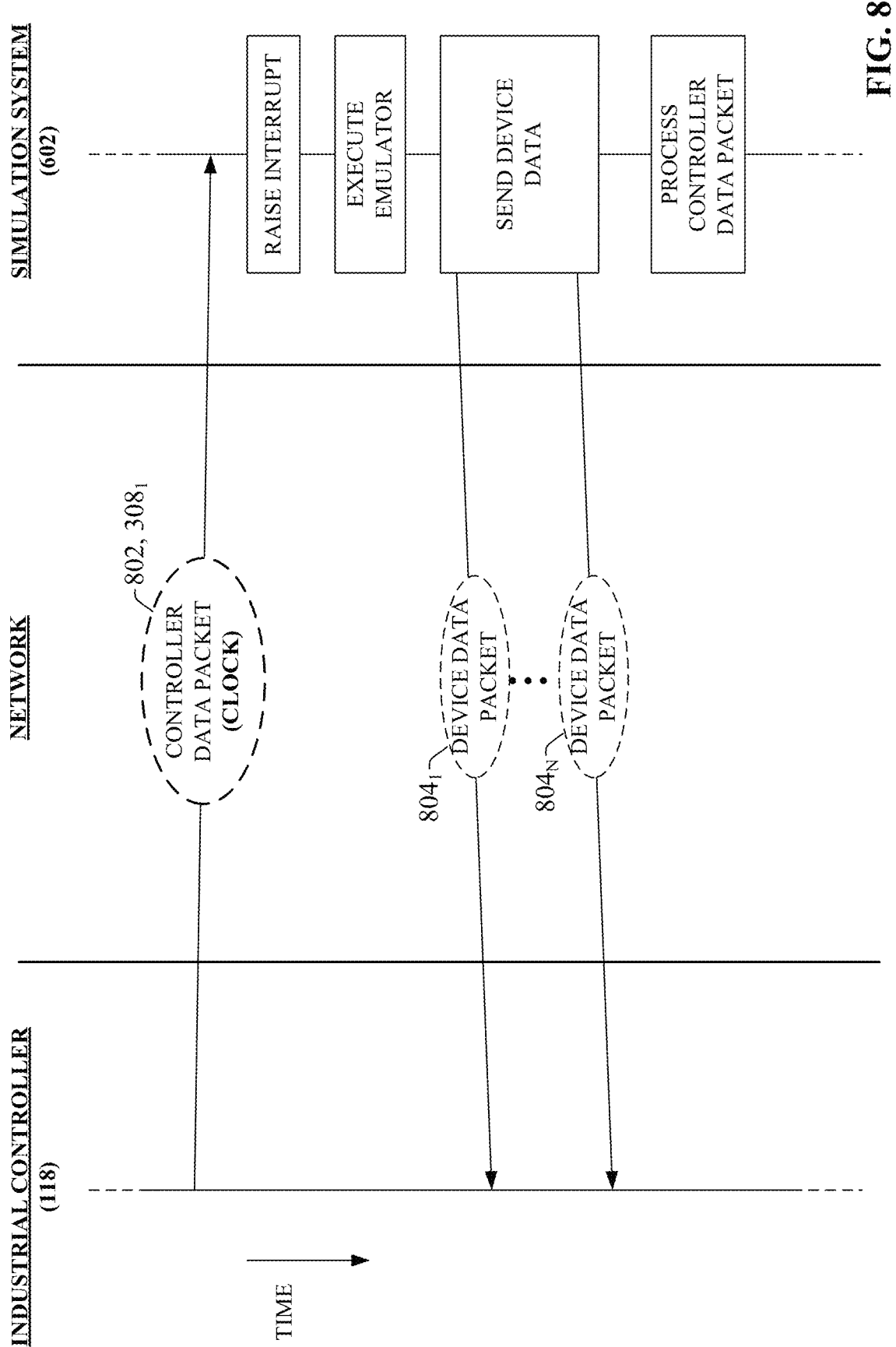
FIG. 8 is an example data exchange timing diagram illustrating the use of a data packet from an industrial controller as a clock signal to trigger the sending of data packets from a simulation system to the controller.

FIG. 8 is an example data exchange timing diagram illustrating the use of a data packet from the controller 118 as a clock signal to trigger the sending of data packets from the simulation system to the controller 118. During simulation of the virtual system, the controller 118 sends data packets to the device emulators 302, 304 at respective fixed frequencies (e.g., via network 402 if the architecture depicted in FIG. 4 is used). For a given emulated device, the frequency at which the controller 118 sends data packets to the emulated device may depend on the type of the device or the function of the device within the industrial system. For example, the controller 118 may send data packets to sensor emulators 302 at a relatively low frequency (long packet intervals) since the primary role of the sensor emulators 302 is to send high frequency input data 306 representing measured states of the virtualized industrial equipment (digital simulation 310) to the controller 118, while the controller 118 may only send low frequency data packets back to the sensor emulators 302 to indicate that the controller is still present. However, the controller 118 may send data packets to effector emulators 304 at relatively high frequencies since these data packets carry the output data 308 used to control the states of the effectors 304.

From the available streams of data packets that are to be sent by the controller 118 to the respective device emulators 302, 304, the simulation system 602 can select a stream of data packets 802 from the controller 118 that satisfies a defined criterion indicative of the packet stream's suitability as a clock signal. For example, the system 602 can choose a stream of data packets 802—e.g., the data packets that carry output data $308_1$ to effector emulator $304_1$ in the example depicted in FIG. 7—having a sufficiently high packet frequency (that is, a sufficiently short packet interval) that renders the packets 802 suitable for use as a clock signal.

In some embodiments, as an alternative to automated selection of a data stream, the system 602 can allow a user to explicitly select a data packet stream that is to be used as the clock signal. The simulation system 602 will use the arrival time of data packets 802 of the selected packet stream as the clock signal for sending data packets from the device emulators 302, 304 to the controller 118.

During the simulation, in response to detecting arrival of a controller data packet 802 of the data stream that was designated to be used as the clock signal, the simulation system 602 sends any device data packets 804 that are scheduled for transmission to the controller 118 for the present clock cycle. These device data packets may include, for example, packets 804 carrying simulated input data 306 generated by the sensor emulators 302, as well as any lower frequency data packets 804 carrying data generated by the effector emulators 304 (e.g., data packets indicating to the controller 118 that the effector emulators are present and receiving the controller's output data 308). The device data packets 804 that are sent by the simulation system 602 need not be functionally related to the controller data packet 802 that triggered the sending of the device packets 804. Rather, any device data packets 804 that are currently scheduled to be sent to the controller 118 will be sent upon detecting the arrival of the next controller data packet 802, regardless of the functional relationship between the controller data packet 802 and the device data packets 804 within the context of the control application being simulated.

The processing carried out by the simulation system 602 to send the device data packets 804 can vary depending on the operating system on which the simulation system 602 executes. In the example depicted in FIG. 8, in response to detecting the arrival of the next controller data packet 802 of the selected data packet stream, the simulation system 602 can raise an interrupt (e.g., by calling a Windows interrupt service routine in the case of the Windows operating system), execute the device emulators 302, 304 to update the device data packets 804, and send the device data packets 804 to the controller 118. In some embodiments, the simulation system 602 will defer processing of the received controller data packet 802 until after the device data packets 804 have been sent. This can ensure that the device data packets 804 are sent out at the correct time, since the time required to process the controller data packet 802 may be variable.

Simulation system 602 executes the sequence depicted in FIG. 8 each time a controller data packet 802 from the data stream designated as the clock signal is received. In some control applications, the device data packets 804 that are sent to the controller 118 in response to arrival of the controller data packet 802 may not be the same for each clock cycle, but rather may depend on which device emulators 302, 304 are scheduled to send data packets 804 to the controller 118 for the current clock cycle.

Since the timing of the controller data packets 802 is strictly controlled by the controller's internal clock, and the packets 802 are sent at a high frequency reflective of the short packet intervals of many physical I/O devices, triggering the sending of device data packets 804 based on the arrival times of these controller data packets 802 rather than the operating system clock can more reliably simulate industrial communication protocols that send device data at short packet intervals with high accuracy, thereby reducing or eliminating jitter during simulation. Moreover, this approach does not require the use of additional external hardware or circuitry to emulate the industrial network or to supersede the operating system clock of the simulation hardware platform.

Although this simulation data exchange approach has been described herein within the context of an industrial simulation architecture in which a hardware controller 118 exchanges data with virtualized industrial equipment, some embodiments of simulation system 602 can also use this approach to exchange simulated data with an emulated (or virtualized) industrial controller that emulates execution of the control program 214. In some such embodiments, the emulated industrial controller can execute on the same hardware platform as the simulation system 602, and the simulated input and output data is exchanged between the emulated controller and the simulation system 602 using the hardware and software resources of the shared hardware platform.

Figure 9:
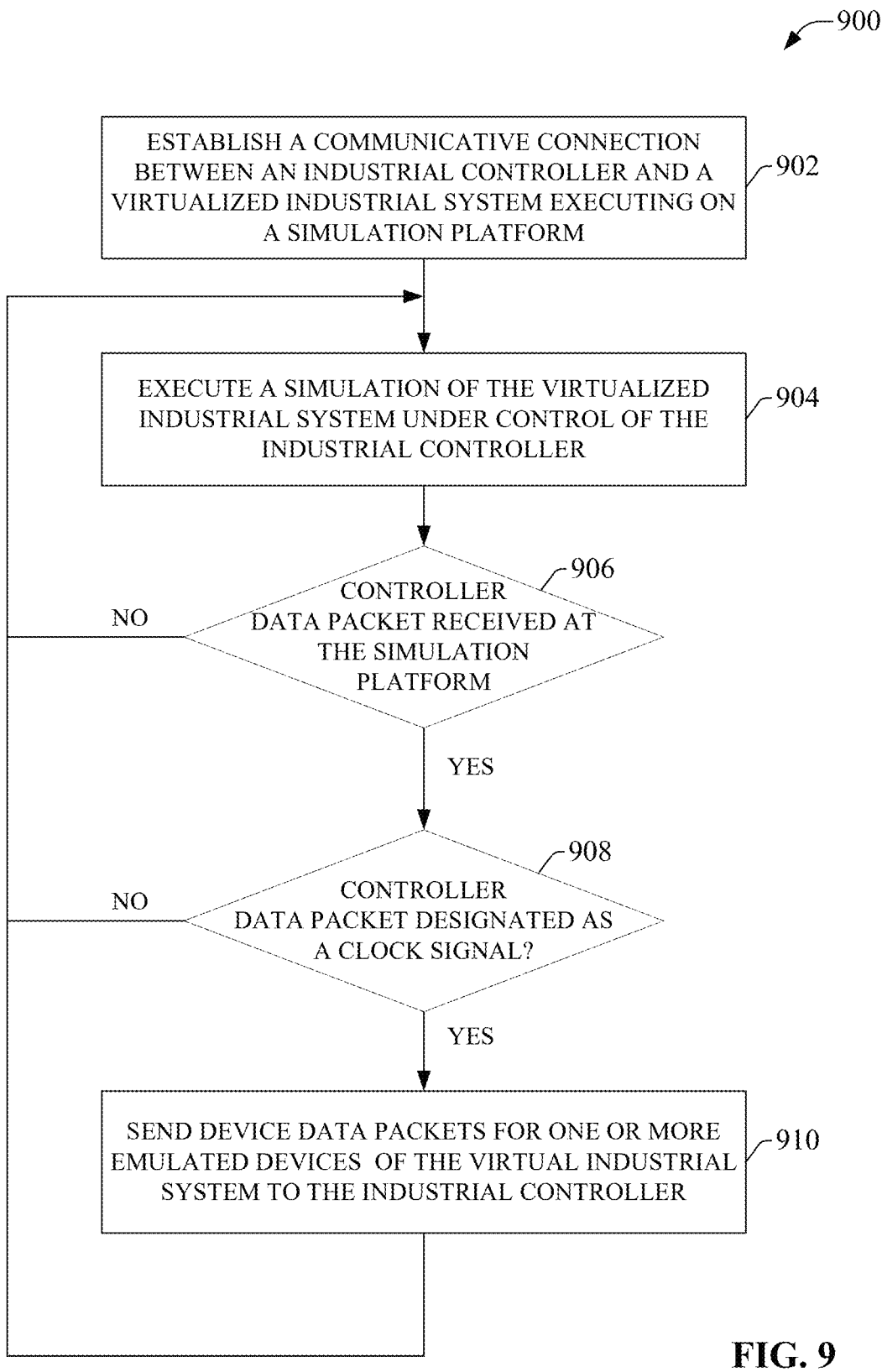
FIG. 9 is a flowchart of an example methodology for exchanging simulated controller and device data between a hardware industrial controller and a virtualized industrial system that executes on a simulation platform.

FIG. 9 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9 illustrates an example methodology 900 for exchanging simulated controller and device data between a hardware industrial controller and a virtualized industrial system that executes on a simulation platform. Initially, at 902, a communicative connection is established between an industrial controller and a virtualized industrial system executing on a simulation platform. In some architectures, the connection can be established over a network connection that links the industrial controller to the hardware platform (e.g., a computer configured with Windows or another operating system) on which the simulation platform executes. The virtualized industrial system comprises a digital model of a real-world industrial system—e.g., an industrial machine or production line—that is to be controlled by the industrial controller.

At 904, a simulation of the virtualized industrial system under control of the industrial controller is executed. During this simulation, the virtualized industrial system will receive controller output data from the industrial controller directed to various emulated I/O devices of the virtualized industrial system, emulate behaviors of the industrial system in response to the controller output data, and send simulated device data back to the controller based on various simulated real-time states of the virtualized industrial system. The timing of these data exchanges is handled in accordance with steps 906-910 of the methodology 900, discussed below.

At 906, a determination is made as to whether a controller data packet has been received at the simulation platform. Typically, the controller will send data packets to multiple emulated I/O devices defined as part of the virtualized industrial system. For each emulated I/O device, the controller sends its output data packets according to a fixed packet interval, where this packet interval may vary for different I/O devices. If no controller data packet has been received (NO at step 906), the methodology returns to step 904 and the simulation continues to execute. Alternatively, if a controller data packet is received (YES at step 906), the methodology proceeds to step 908, where a determination is made as to whether the controller data packet received at step 906 is a packet that has been designated as a clock signal for sending emulated device data back to the controller. In this regard, a specified stream of controller data packets from the controller to a particular emulated I/O device can be pre-selected to serve as a clock signal that drives the sending of device data packets from the virtualized industrial system back to the controller. If the controller data packet received a step 908 is not a data packet from this specified data stream (NO at step 908), the methodology returns to step 904 and the simulation continues to execute.

Alternatively, if the controller data packet received at step 906 is a packet that has been designated as a clock signal (YES at step 908), the methodology proceeds to step 910, where device data packets generated by one or more emulated I/O devices of the virtualized industrial system are sent to the industrial controller. The specific device data packets that are sent at step 910 can be those that are currently scheduled to be sent to the controller for the current clock cycle. The methodology then returns to step 904, and the simulation continues to execute.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
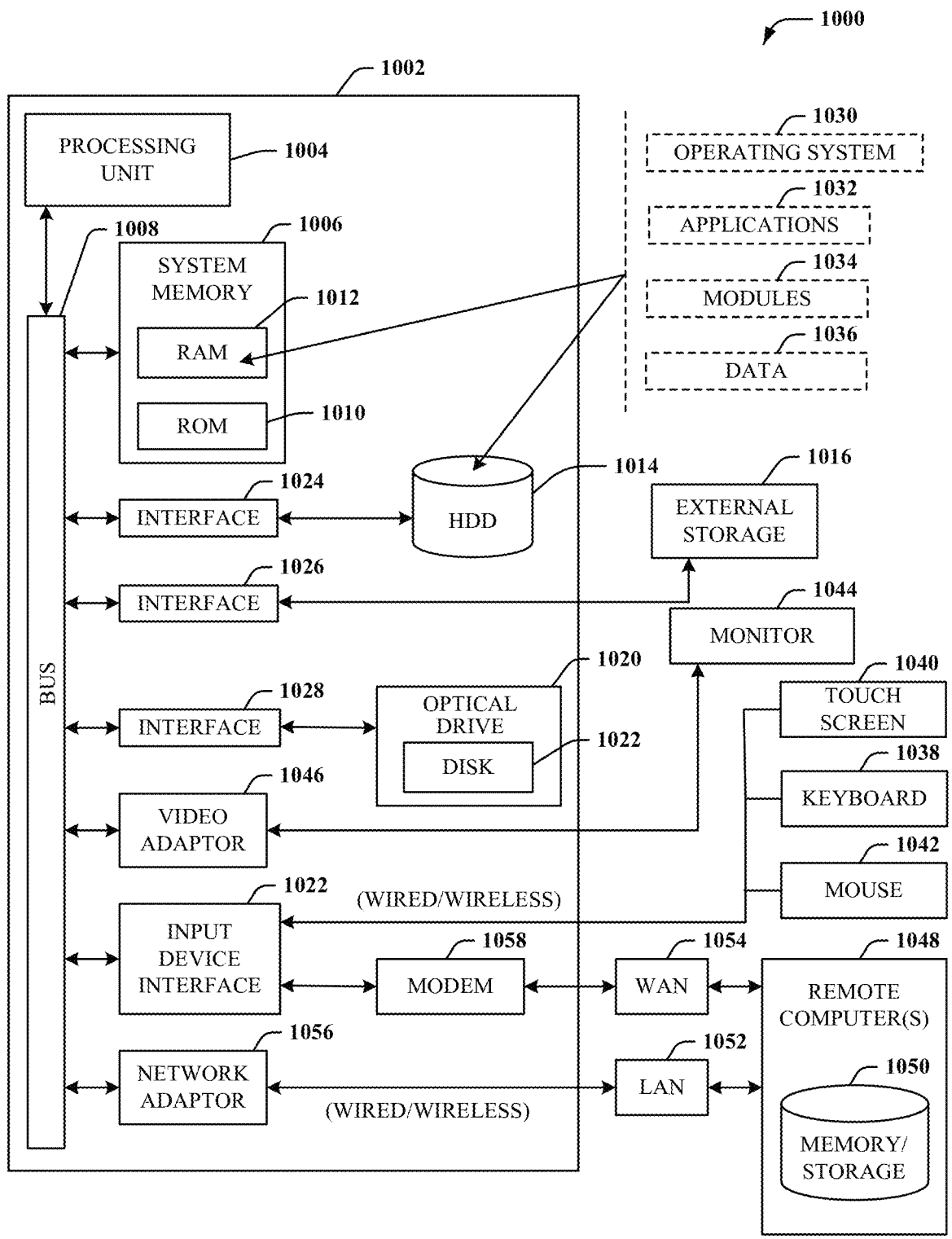
FIG. 10 is an example computing environment.
Figure 11:
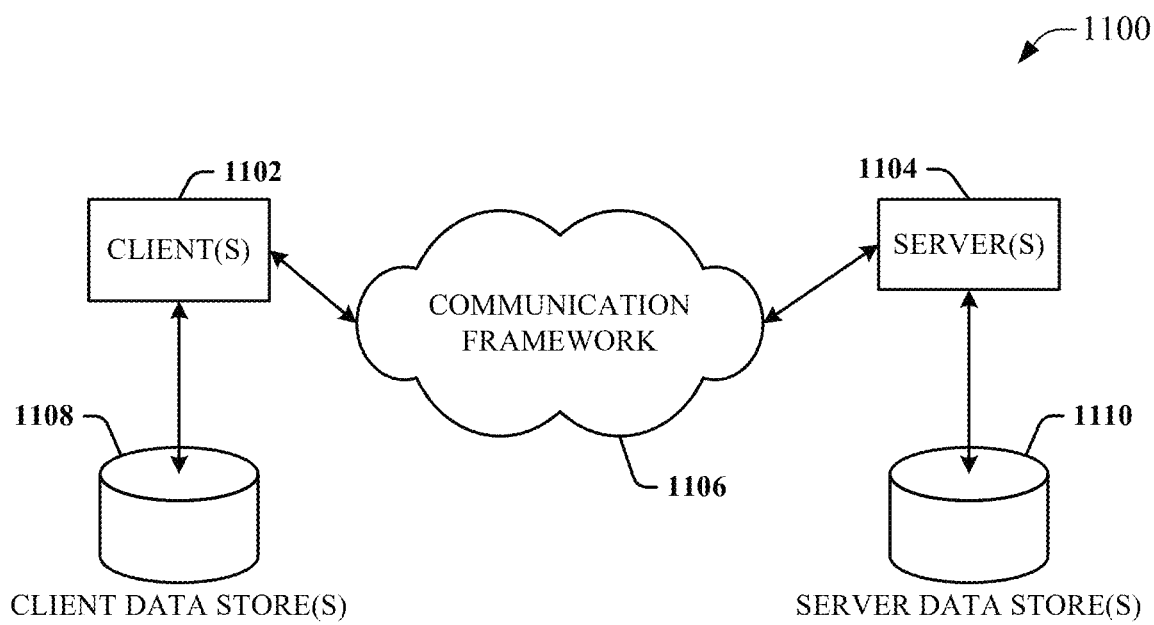
FIG. 11 is an example networking environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10 In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1022 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1048. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the adapter 1056 in a wireless mode.

When used in a WAN networking environment, the computer 1002 can include a modem 1058 or can be connected to a communications server on the WAN 1054 via other means for establishing communications over the WAN 1054, such as by way of the Internet. The modem 1058, which can be internal or external and a wired or wireless device, can be connected to the system bus 1008 via the input device interface 1022. In a networked environment, program modules depicted relative to the computer 1002 or portions thereof, can be stored in the remote memory/storage device 1050. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1052 or WAN 1054 e.g., by the adapter 1056 or modem 1058, respectively. Upon connecting the computer 1002 to an associated cloud storage system, the external storage interface 1026 can, with the aid of the adapter 1056 and/or modem 1058, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 2100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 2104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for simulating industrial systems, comprising:
a memory that stores executable components; and
a processor, operatively coupled to the memory, that executes the executable components, the executable components comprising:
a simulation component configured to execute a simulation of an industrial system under control of an industrial controller based on a virtual model of the industrial system; and
a communication control component configured to receive streams of controller data from the industrial controller directed to respective emulated devices of the virtual model and to send streams of simulated device data generated by the respective emulated devices to the industrial controller, wherein the communication control component is configured to designate a stream of the controller data directed to one of the emulated devices as a clock signal that drives sending of packets of the simulated device data from the emulated devices to the industrial controller via the streams of simulated device data, and to send the packets of the simulated device data from the emulated devices to the industrial controller via the streams of the simulated device data in response to receiving a controller data packet via the stream of the controller data designated as the clock signal, and the stream of the controller data designated as the clock signal substitutes for a system clock of an operating system of the system in driving the sending of the packets of the simulated device data.

2. The system of claim 1, wherein the communication control component is configured to designate the stream of the controller data based on a determination that controller data packets associated with the stream of the controller data are sent by the industrial controller at a frequency that satisfies a defined criterion.

3. The system of claim 2, wherein the defined criterion is a minimum frequency that emulates a device data packet interval supported by an industrial network protocol.

4. The system of claim 1, further comprising a user interface component configured to receive user input that selects the stream of the controller data to be designated as the clock signal.

5. The system of claim 1, wherein the emulated devices comprise digital emulations of at least one of a photosensor, a proximity switch, a telemetry device, a push button, a safety input device, a variable frequency drive, a pneumatic or hydraulic actuator, a motor contactor, an industrial robot, or a visual indicator.

6. The system of claim 1, wherein the emulated devices that generate the packets of the simulated device data that are sent in response to receiving the controller data packet include at least one emulated device that is different than the one of the emulated devices to which the stream of the controller data is directed.

7. The system of claim 1, wherein packet intervals of the stream of the controller data define respective clock cycles, and for a clock cycle of the clock cycles, the communication control component sends the packets of the simulated device data prior to processing of the controller data packet by the simulation component.

8. The system of claim 1, further comprising a user interface component configured to render a graphical representation of the simulation on a client device based on the virtual model and values of the controller data and the simulated device data.

9. The system of claim 1, wherein the industrial controller is one of a hardware industrial controller or an emulated industrial controller.

10. A method, comprising:

executing, by a system comprising a processor, a simulation of an industrial system under control of an industrial controller based on a digital model of the industrial system;

receiving, by the system, streams of controller data from the industrial controller directed to respective emulated devices of the digital model; and sending, by the system, streams of simulated device data generated by the respective emulated devices to the industrial controller, wherein the sending comprises:

in response to receiving a controller data packet via a stream of controller data, of the streams of controller data, designated as a clock signal that drives sending of packets of the simulated device data from the emulated devices to the industrial controller via the streams of the simulated device data, sending the packets of the simulated device data generated by the emulated devices to the industrial controller via the streams of the simulated device data, wherein the stream of controller data designated as the clock signal supersedes a system clock of an operating system of the system in driving the sending of the packets of the simulated device data.

11. The method of claim 10, further comprising selecting, as the stream of controller data designated as the clock signal, a stream of the controller data directed to one of the emulated devices.

12. The method of claim 11, wherein the sending further comprises sending at least one packet of the simulated device data generated by at least one emulated device that is different than the one of the emulated devices to which the stream of the controller data is directed.

13. The method of claim 10, further comprising selecting, by the system, the stream of controller data to be designated as the clock signal based on a determination that controller data packets associated with the stream of controller data are sent by the industrial controller at a frequency that satisfies a defined criterion.

14. The method of claim 10, wherein the defined criterion is a minimum frequency that emulates a device data packet interval supported by an industrial network protocol.

15. The method of claim 10, further comprising selecting, by the system, the stream of controller data to be designated as the clock signal based on receipt of user input that selects the stream of controller data.

16. The method of claim 10, wherein the emulated devices comprise digital emulations of at least one of a photosensor, a proximity switch, a telemetry device, a push button, a safety input device, a variable frequency drive, a pneumatic or hydraulic actuator, a motor contactor, an industrial robot, or a visual indicator.

17. The method of claim 10, wherein packet intervals of the stream of controller data define respective clock cycles, and the sending of the packets of the simulated device data comprises, for a clock cycle of the respective clock cycles, sending the packets of the simulated device data prior to processing of the controller data packet.

18. A non-transitory computer-readable medium having stored thereon instructions that, in response to execution, cause a system comprising a processor to perform operations, the operations comprising:

executing a simulation of an industrial system under control of an industrial controller based on a virtual model of the industrial system, wherein the executing comprises:

receiving streams of controller data from the industrial controller directed to respective emulated devices of the digital model; and sending streams of simulated device data generated by the respective emulated devices to the industrial controller, wherein the sending comprises, in response to receiving a controller data packet via a stream of controller data, of the streams of controller data, designated as a clock signal that triggers sending of packets of the simulated device data from the emulated devices to the industrial controller, sending the packets of the simulated device data generated by the emulated devices to the industrial controller via the streams of the simulated device data, and the stream of controller data designated as the clock signal substitutes for a system clock of an operating system of the system in triggering the sending of the packets of the simulated device data.

19. The non-transitory computer-readable medium of claim 18, wherein the operations further comprise selecting, as the stream of controller data designated as the clock signal, a subset stream of the controller data directed to one of the emulated devices.

20. The non-transitory computer-readable medium of claim 19, wherein the sending further comprises sending at least one packet of the simulated device data generated by at least one emulated device that is different than the one of the emulated devices to which the stream of controller data is directed.

\* \* \* \* \*